(12) United States Patent
Dewey

(10) Patent No.: US 10,716,290 B1
(45) Date of Patent: Jul. 21, 2020

(54) PROTECTIVE HOUSING FOR DOG CHEWS

(71) Applicant: HIMALAYAN CORPORATION, Mukilteo, WA (US)

(72) Inventor: Alan J. Dewey, Marysville, WA (US)

(73) Assignee: HIMALAYAN CORPORATION, Mukilteo, WA (US)

( * ) Notice: Subject to any disclaimer, the term of this patent is extended or adjusted under 35 U.S.C. 154(b) by 479 days.

(21) Appl. No.: 15/676,724

(22) Filed: Aug. 14, 2017

(51) Int. Cl.
*A01K 15/02* (2006.01)

(52) U.S. Cl.
CPC .................. *A01K 15/026* (2013.01)

(58) Field of Classification Search
CPC ............ A01K 15/025; A01K 15/026
USPC .......... 119/707, 708, 709, 710, 711
See application file for complete search history.

(56) References Cited

U.S. PATENT DOCUMENTS

| | | | | |
|---|---|---|---|---|
| 2,003,958 | A * | 6/1935 | Salisbury | A63H 5/00 119/709 |
| 6,401,665 | B1 * | 6/2002 | Gentile | A01K 15/025 119/707 |
| 7,032,541 | B1 * | 4/2006 | Tsengas | A01K 15/026 119/709 |
| 8,701,599 | B2 | 4/2014 | Dewey | |
| 2006/0213454 | A1 * | 9/2006 | Wolfe, Jr. | A01K 5/0114 119/709 |
| 2009/0078214 | A1 * | 3/2009 | Mann | A01K 15/026 119/709 |
| 2009/0095231 | A1 * | 4/2009 | Axelrod | A01K 15/026 119/709 |
| 2009/0151649 | A1 * | 6/2009 | Vardy | A01K 15/026 119/710 |
| 2011/0226191 | A1 * | 9/2011 | Curry | A01K 15/025 119/707 |
| 2011/0297104 | A1 * | 12/2011 | Axelrod | A01K 15/026 119/709 |
| 2012/0111284 | A1 * | 5/2012 | Berger | A01K 15/026 119/709 |
| 2012/0204809 | A1 * | 8/2012 | Axelrod | A01K 15/026 119/709 |
| 2013/0036988 | A1 * | 2/2013 | Lai | A01K 15/026 119/709 |
| 2014/0318472 | A1 * | 10/2014 | Day | A01K 15/025 119/707 |
| 2015/0237829 | A1 * | 8/2015 | Tsengas | A01K 15/025 119/709 |
| 2015/0289483 | A1 * | 10/2015 | Spinelli | A01K 15/026 119/709 |
| 2016/0255812 | A1 * | 9/2016 | Wolfe, Jr. | A01K 15/026 |
| 2017/0020109 | A1 * | 1/2017 | Dewey | A01K 15/026 |
| 2020/0015454 | A1 * | 1/2020 | Sporn | A01K 15/025 |

* cited by examiner

*Primary Examiner* — Tien Q Dinh
*Assistant Examiner* — Brady W Frazier
(74) *Attorney, Agent, or Firm* — Amin, Turocy & Watson, LLP

(57) ABSTRACT

A protective housing for a dog chew may comprise an elongated middle section coupled with bulbous end sections at either end. The middle section may comprise a tunnel extending lengthwise there through, and at least one of the end sections may have a chew insertion window. The chew insertion window may be in line with the tunnel axis, thereby allowing insertion of a chew through the chew insertion window and into the tunnel. Chew access windows may be formed along the middle section, thereby allowing partial access to the chew, while also protecting the chew to extend its life.

20 Claims, 3 Drawing Sheets

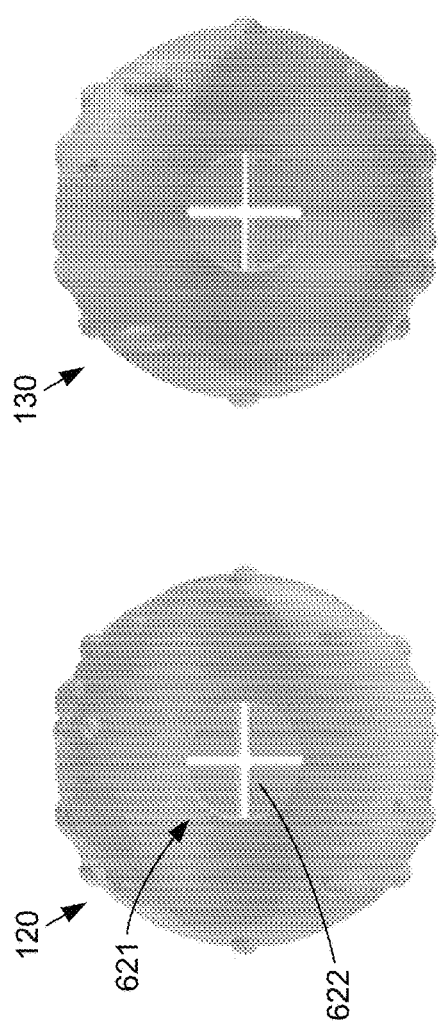
FIG. 6
FIG. 7
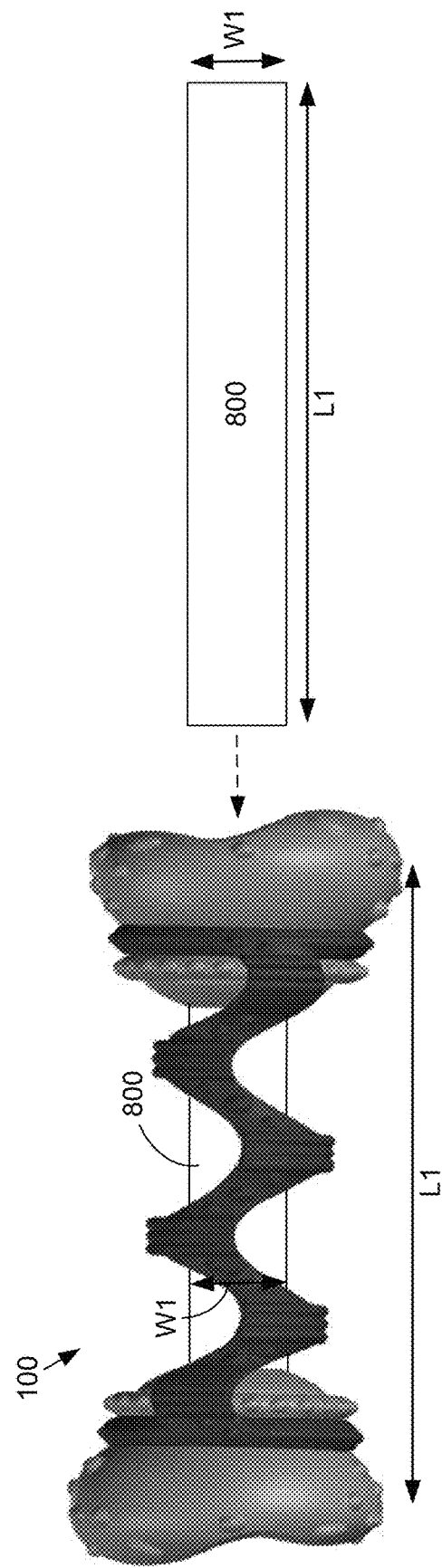
FIG. 8

PROTECTIVE HOUSING FOR DOG CHEWS

BACKGROUND

There are a variety of popular pet toy products available in pet supply stores. Pet "toys", such as balls, ropes, and rubber chew toys, are distinguished herein from pet "chews" such as bones, rawhides, bully sticks, and hardened cheeses, in that pet toys are not designed for consumption while pet chews are designed to be at least partially consumed. While chews made of relatively tough materials can withstand the stress of being chewed for some time, it is nonetheless desirable to extend the life of chews, particularly for certain pets. Furthermore, it may be desirable add interest to chews by making them more challenging and/or entertaining. In general, there is an ongoing need to increase the variety of both pet toy and pet chew products to meet the needs and preferences available to dog and other pet owners.

SUMMARY

A protective housing for dog chews is disclosed, as well as methods of making and using the disclosed product. In some examples, a protective housing for dog chews may include an elongated middle section, a first bulbous end section, and a second bulbous end section. The middle section may have a middle section length, a proximal end, and a distal end. The first bulbous end section may be coupled with the middle section at the proximal end thereof, and the second bulbous end section may be coupled with the middle section at the distal end thereof.

A tunnel may be formed inside the elongated middle section, such that the tunnel extends lengthwise from the proximal end to the distal end. The tunnel may be adapted to receive a chew inserted therein. A plurality of chew access windows may also be formed in the middle section, wherein each of the chew access windows opens into a portion of the tunnel, so that portions of the chew inserted into the tunnel are accessible from outside the middle section.

A first end section interface may be positioned at the proximal end of the middle section, and a second end section interface may be positioned at the distal end of the middle section. The first and second bulbous end sections may be adapted to couple with the middle section at the end section interfaces. At least one of the first and second bulbous end sections may comprise a chew insertion window, in order to permit insertion of the chew into the tunnel. Additional aspects and features of this disclosure will be apparent from the detailed description and drawings.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein:

FIG. 6 is a right side elevation view thereof;
FIG. 7 is a left side elevation view thereof;
and
FIG. 8 is a front elevation view showing insertion of an example chew into the protective housing.

DETAILED DESCRIPTION

Figure 1:
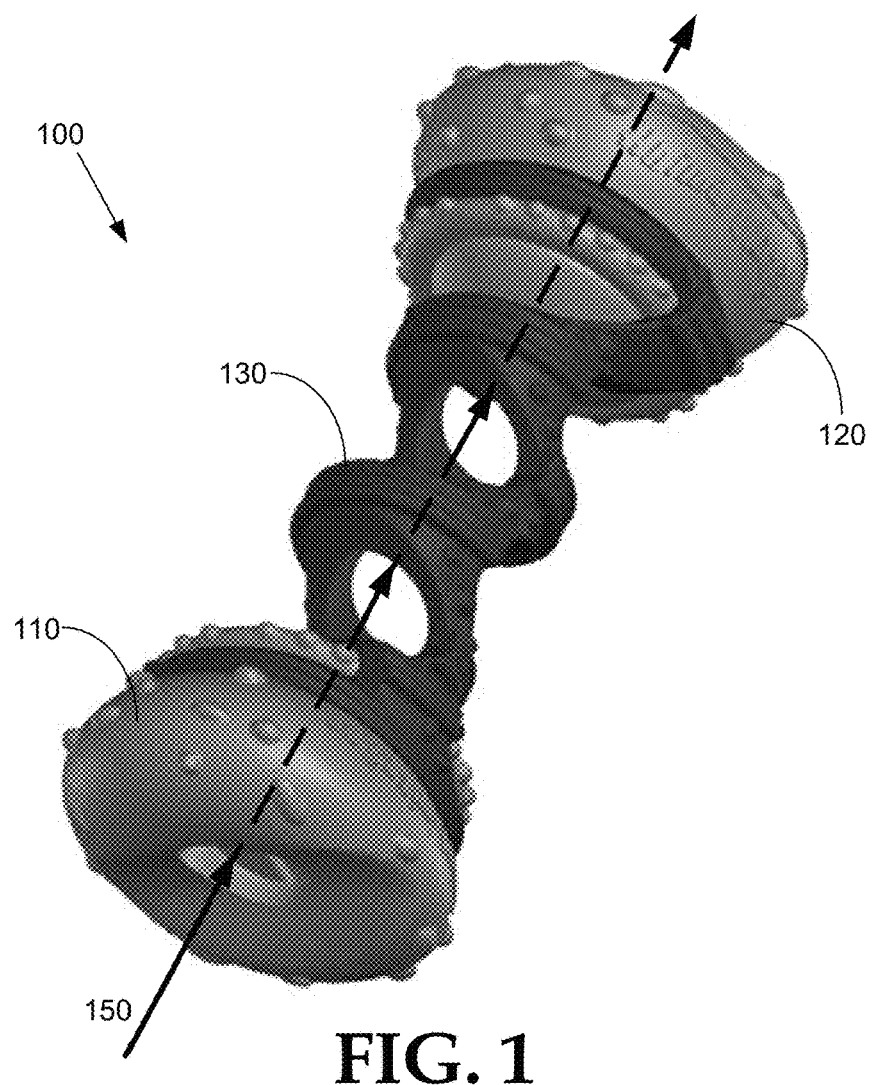
FIG. 1 is a perspective view of an example protective housing for a dog chew.

Prior to explaining embodiments of the invention in detail, it is to be understood that this disclosure is not limited to the details of construction or arrangements of the components and method steps set forth in the following description or illustrated in the drawings. Embodiments of this disclosure are capable of other embodiments and of being practiced and carried out in various ways. Also, it is to be understood that the phraseology and terminology employed herein are for the purpose of the description and should not be regarded as limiting.

This disclosure describes a protective housing for a dog chew. The disclosed protective housing may optionally have a bone-like shape, with an elongated middle section and bulbous end sections at either end. The middle section may comprise a tunnel extending lengthwise there through, and at least one of the end sections may have a chew insertion window. The chew insertion window may be in line with the tunnel axis, thereby allowing insertion of a chew through the chew insertion window and into the tunnel. Chew access windows may be formed along the middle section, thereby allowing partial access to the chew, while also protecting the chew to extend its life. The middle section and end sections may optionally be made from different materials, e.g., a non-deformable middle section, providing sturdy chewing resistance, may be paired with deformable end sections which permit the product to bounce when thrown or dropped.

FIG. 1 is a perspective view of an example protective housing 100 for a dog chew, in accordance with some embodiments of this disclosure. Protective housing 100 includes an elongated middle section 130, a first bulbous end section 110, and a second bulbous end section 120. Middle section 130 has a middle section length extending between a proximal end that is coupled with end section 110, and a distal end that is coupled with end section 120.

A tunnel formed inside the middle section 130 has a tunnel axis 150. The tunnel extends lengthwise from the proximal end to the distal end. The tunnel is adapted to receive a chew inserted into the tunnel, e.g., as illustrated in FIG. 8.

In some embodiments, protective housing 100 may have an overall length of about 7.25 inches, and bulbous end sections 110 and 120 may each have a diameter of about 3 inches. Of course, embodiments may comprise other dimensions as appropriate. Lengths between about 5 and 9 inches may be appropriate for many embodiments, and diameters (or width measurements, for embodiments which are not round) between about 1.5 and 4.5 inches may be appropriate for many embodiments. The various other dimensions of protective housing 100 may be inferred from the figures.

A variety of other shape and dimension configurations may be substituted in FIG. 1, as will be appreciated. For example, rectangular or polygonal structures may be used in some embodiments. Structures having a wide variety of attachments, curvatures, protrusions or other abnormalities may also be employed in some embodiments.

In the illustrated embodiment, the middle section 130 comprises a cylindrical middle portion 233 between first and second end section interfaces. Each end section interface comprises a ring 231 of greater diameter than the cylindrical middle portion 233. An angled bridge 232 connects the cylindrical middle portion 233 with the ring 231. The first and second bulbous end sections 110, 120 each comprise a disk portion 221 and a bulb portion 223 separated by a round groove 222. The round groove 222 couples with the rings 231 of the first and second end section interfaces, thereby securely attaching the first and second bulbous end sections 110, 120 with the middle section 130. The middle section can be made of a substantially non-deformable nylon material.

In the illustrated embodiment, the middle section 130 comprises a cylindrical middle portion 233 between first and second end section interfaces. Each end section interface comprises a ring 231 of greater diameter than the cylindrical middle portion 233. An angled bridge 232 connects the cylindrical middle portion 233 with the ring 231. The first and second bulbous end sections 110, 120 each comprise a disk portion 221 and a bulb portion 223 separated by a round groove 222. The round groove 222 couples with the rings 231 of the first and second end section interfaces, thereby securely attaching the first and second bulbous end sections 110, 120 with the middle section 130.

In the illustrated embodiment, the first and second bulbous end sections 110, 120 comprise end section widths which, at their widest, are larger than a largest width of the middle section 130. For example, the width of the bulb portion 223 is larger than the width of the ring 231. This gives the protective housing 100 a bone-like shape. In some embodiments, the first and second bulbous end sections 110, 120 may be made of least partially deformable material, such as rubber, such that the protective housing 100 bounces when dropped on the first or second bulbous end section 110 or 120, or when thrown as a fetch toy. The terms "deformable" and "non-deformable" are defined herein as understood by those of skill in the art, namely, whether the material can be deformed by hand.

Figure 2:
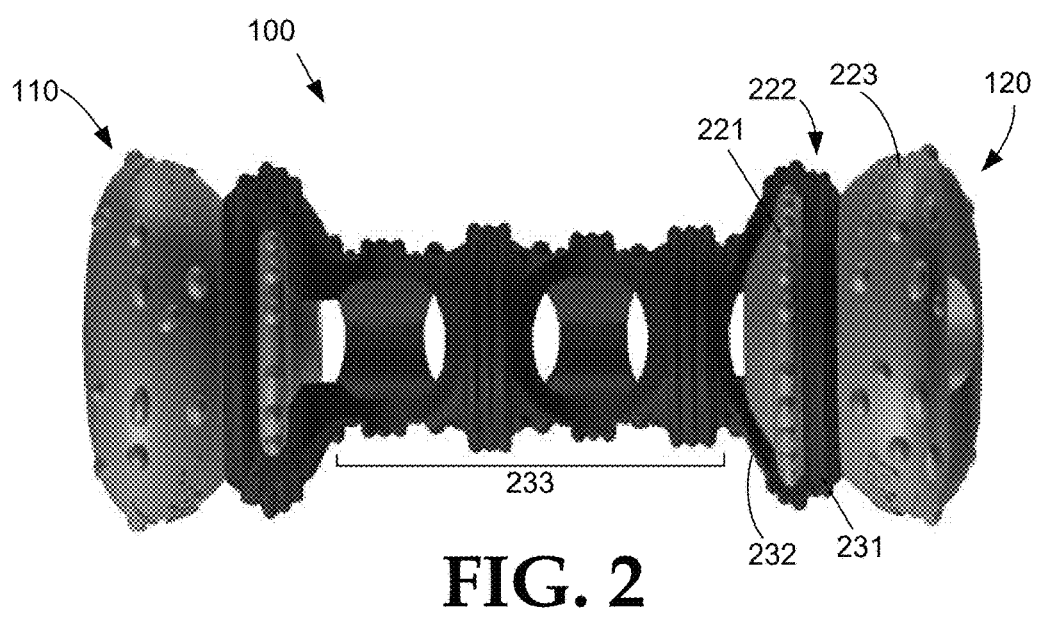
FIG. 2 is top plan view thereof.
Figure 3:
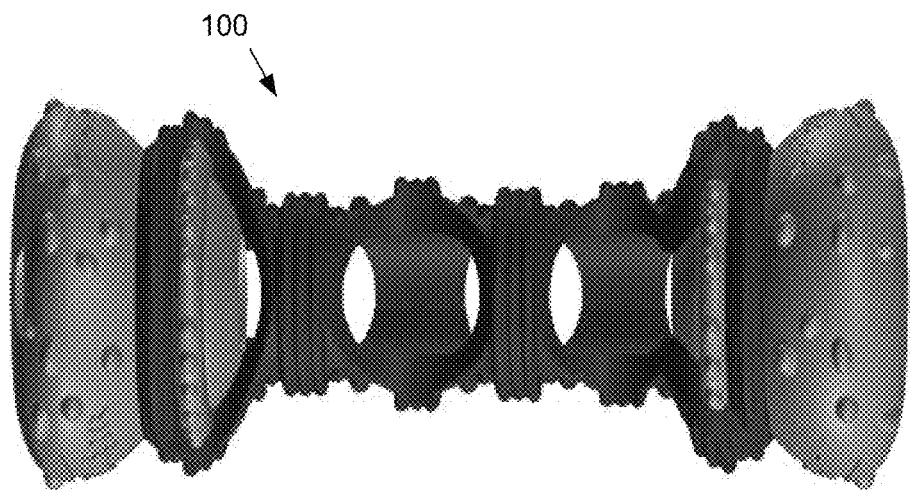
FIG. 3 is a bottom plan view thereof.

A variety of other interface structures may be substituted in FIG. 2, as will be appreciated. For example, the pieces may be glued or welded together in some embodiments. Interface structures such as clips, brackets, or using screws or other fasteners may also be employed in some embodiments.

Figure 4:
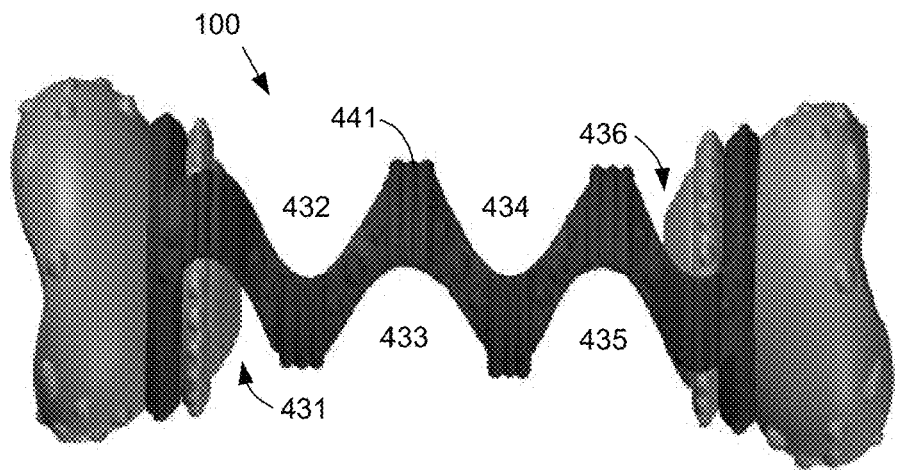
FIG. 4 is a front elevation view thereof.

FIG. 4 is a front elevation view of protective housing 100. FIG. 4 illustrates a plurality of chew access windows 431, 432, 433, 434, 435, and 436 in the middle section 130, wherein each of the chew access windows 431-436 opens into a portion of the tunnel, so that portions of the chew inserted into the tunnel (e.g., as shown in FIG. 8) are accessible from outside the middle section 130.

In the illustrated embodiment, chew access windows 431-436 are conical in shape, with rounded cone tips. It will be appreciated that similar shapes, such as half ellipses or sinusoidal shapes may be used. Chew access windows 431-436 may also be rectangular or polygonal in shape. Furthermore, chew access windows 431-436 open onto opposite sides of the middle section 130, however, chew access windows 431-436 may be oriented differently in some embodiments. Furthermore, chew access windows 431-436 are staggered along the middle section 130, so that portions of multiple chew access windows, e.g., chew access windows 432 and 433, intersect one or more planes perpendicular to the middle section length 430. For example, one or more imaginary vertical planes may slice through middle section 130 in locations that bisect both chew access window 432 and chew access window 433.

FIG. 4 furthermore illustrates reinforced sections such as 441 between chew access windows 431-436. In the illustrated embodiment, reinforced section 441 is positioned between chew access windows 432 and 433 which face in a same direction. Reinforced section 441 includes bands of increased material thickness. However, a variety of other reinforcement techniques, such as the inclusion of sturdier material, may be employed in some embodiments.

Figure 5:
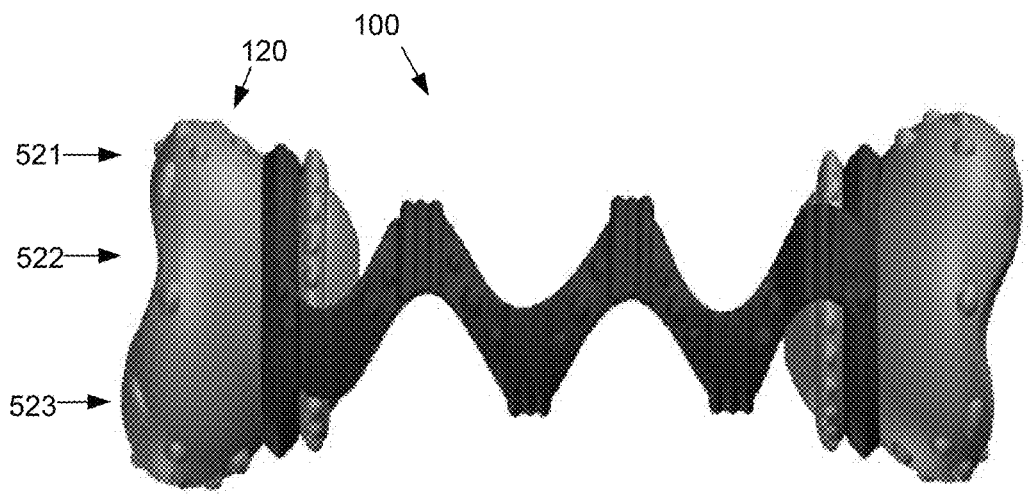
FIG. 5 is a rear elevation view thereof.

FIG. 5 is a rear elevation view of protective housing 100. FIG. 5 illustrates example shape features of an end section 120. In the illustrated embodiment, the bulb portion of end section 120 includes asymmetrical bulges 521 and 522, separated laterally by a valley 522. Bulges 521 and 522 are asymmetrical in that bulge 522 is larger than bulge 521. Furthermore, both the middle section 130 and end sections 110, 120 include various raised surface elements, including various bumps and texture elements.

FIG. 6 is a right side elevation view of protective housing 100, and FIG. 7 is a left side elevation view of protective housing 100. FIG. 6 illustrates second bulbous end section 120, while FIG. 7 illustrates first bulbous end section 110. As illustrated in FIG. 6, at least one bulbous end section 120 may comprise a chew insertion window 621 in order to permit insertion of a chew (e.g., chew 800 illustrated in FIG. 8) into the tunnel. In some embodiments, both bulbous end sections 110 and 120 may include a chew insertion window, as shown in FIGS. 6 and 7.

Chew insertion window 621 may generally comprise an opening that is axially aligned with tunnel axis 150, and shaped to fit a chew there through. Chew insertion window 621 may be round, as shown, or any other shape as may be desired. Chew insertion window 621 may extend through the entirety of the bulbous end section 120, including both the bulb portion and disc portion thereof. In some embodiments, the interior of the bulbous end section 120 may be a hollow air cavity, and so chew insertion window 621 may comprise a first window in the bulb portion, and a second window in the disc portion, both of which are axially aligned with tunnel axis 150.

FIG. 6 furthermore illustrates a slide preventer 622 in order to prevent the chew from sliding out of the tunnel. In the illustrated embodiment, slide preventer 622 comprises four flexible flaps extending into chew insertion window 621. The flaps fold away under pressure to allow insertion of a chew, and spring back into place to prevent the chew from sliding out of the tunnel. It will be appreciated that a variety of other structures such as doors, flaps, springs, plugs, or other structures may be used as slide preventer 622 in some embodiments.

FIG. 8 is a front elevation view of protective housing 100, showing insertion of an example chew 800 into the protective housing 100. Chew 800 may comprise, e.g., a pizzle, hardened cheese, rawhide, or other hard yet edible chew. Chew 800 has a length L1 and a width W1, which are sized so that chew 800 fits through the access window 621 and into the tunnel. For example, a length L1 of about 6 inches and a width W1 of about 0.25-1.0 inches may be appropriate for some embodiments.

In some embodiments, chew 800 may be sized with a length L1 which allows chew 800 to simultaneously extend into both first and second bulbous end sections 110 and 120, without being so long as to require any deformation of first or second bulbous end sections 110 and 120. Chew 800 may be sized with a width W1 which is smaller than the tunnel diameter, especially when middle section 130 is made of non-deformable material. For example, width W1 may be up to a few millimeters smaller than the tunnel diameter.

While various embodiments have been disclosed herein, other aspects and embodiments will be apparent to those skilled in art.

The invention claimed is:

1. A protective housing for dog chews, comprising:
   an elongated middle section having a middle section length, a proximal end, and a distal end;
   a tunnel formed inside said elongated middle section, wherein:
   the tunnel extends lengthwise from the proximal end to the distal end;
   the tunnel is adapted to receive a chew inserted into said tunnel;
   a plurality of chew access windows in said middle section, wherein each of the chew access windows opens into a portion of the tunnel, so that portions of the chew inserted into said tunnel are accessible from outside the middle section;
   a first end section interface positioned at the proximal end of said middle section;
   a second end section interface positioned at the distal end of said middle section;
   wherein at least one of the first or the second end section interfaces comprises a ring;
   a first bulbous end section adapted to couple with said middle section; and
   a second bulbous end section adapted to couple with said middle section;
   wherein at least one of the first or the second bulbous end sections comprises a groove adapted to interlock with the ring; and
   wherein at least one of the first and second bulbous end sections comprises a chew insertion window in order to permit insertion of the chew into said tunnel.

2. The protective housing for dog chews of claim 1, wherein the first and second bulbous end sections comprise end section widths which are larger than a largest width of said middle section.

3. The protective housing for dog chews of claim 1, wherein the chew insertion window comprises a slide preventer in order to prevent the chew from sliding out of the tunnel.

4. The protective housing for dog chews of claim 1, wherein the middle section is substantially non-deformable.

5. The protective housing for dog chews of claim 1, wherein the middle section is made of substantially non-deformable nylon material.

6. The protective housing for dog chews of claim 1, wherein the first and second bulbous end sections are at least partially deformable such that the protective housing for dog chews bounces when dropped on the first or second bulbous end section.

7. The protective housing for dog chews of claim 1, wherein the first and second bulbous end sections are made of deformable rubber material.

8. The protective housing for dog chews of claim 1, wherein the middle section comprises a cylindrical middle portion between the first and second end section interfaces, and wherein the ring is of greater diameter than the cylindrical middle portion.

9. The protective housing for dog chews of claim 8, wherein the groove separates a disk portion and a bulb portion of the at least one of the first or the second bulbous end sections.

10. The protective housing for dog chews of claim 1, wherein the plurality of chew access windows are conical, sinusoidal, or half elliptical in shape.

11. The protective housing for dog chews of claim 10, wherein the plurality of chew access windows open onto opposite sides of the middle section.

12. The protective housing for dog chews of claim 11, wherein the plurality of chew access windows are staggered along the middle section, so that portions of multiple chew access windows intersect one or more planes perpendicular to the middle section length.

13. The protective housing for dog chews of claim 1, wherein the middle section comprises one or more reinforced sections between chew access windows.

14. A protective housing for dog chews, comprising:
   an elongated middle section made of a first, substantially non-deformable material, the elongated middle section having a middle section length, a proximal end, and a distal end;
   a tunnel formed inside said elongated middle section, wherein:
   the tunnel extends lengthwise from the proximal end to the distal end;
   the tunnel is adapted to receive a chew inserted into said tunnel;
   a plurality of chew access windows in said middle section, wherein each of the chew access windows opens into a portion of the tunnel, so that portions of the chew inserted into said tunnel are accessible from outside the middle section;
   a first end section interface positioned at the proximal end of said middle section;
   a second end section interface positioned at the distal end of said middle section;
   wherein at least one of the first or the second end section interfaces comprises a ring;
   a first bulbous end section having a shape adapted to couple with said first end section interface; and
   a second bulbous end section having a shape adapted to couple with said second end section interface;
   wherein at least one of the first or the second bulbous end sections comprises a groove adapted to interlock with the ring; and
   wherein at least one of the first and second bulbous end sections comprises a chew insertion window in order to permit insertion of the chew into said tunnel; and
   wherein the first and second bulbous end sections are made of a second, at least partially deformable material, such that the protective housing for dog chews bounces when dropped on the first or second bulbous end section.

15. The protective housing for dog chews of claim 14, wherein the chew insertion window comprises a slide preventer in order to prevent the chew from sliding out of the tunnel.

16. The protective housing for dog chews of claim 14, wherein the middle section is made of nylon material and the first and second bulbous end sections are made of deformable rubber material.

17. The protective housing for dog chews of claim 14, wherein the middle section comprises a cylindrical middle portion between the first and second end section interfaces, and wherein the first and second end section interfaces comprise rings of greater diameter than the cylindrical middle portion.

18. The protective housing for dog chews of claim 17, wherein the first and second bulbous end sections each comprise a disk portion and a bulb portion separated by a round groove, and wherein the round groove couples with the rings of the first and second end section interfaces.

19. The protective housing for dog chews of claim 14, wherein the plurality of chew access windows are staggered along the middle section, so that portions of multiple chew access windows intersect one or more planes perpendicular to the middle section length.

20. The protective housing for dog chews of claim 14, wherein the middle section comprises one or more reinforced sections between chew access windows.

* * * * *